United States Patent [19]

Berg

[11] 4,067,407
[45] Jan. 10, 1978

[54] ANNULAR SEAL
[75] Inventor: Thorval L. Berg, Warminster, Pa.
[73] Assignee: Greene, Tweed & Co., Inc., North Wales, Pa.
[21] Appl. No.: 694,113
[22] Filed: June 8, 1976
[51] Int. Cl.² ............................. F16J 15/32; F16J 9/06
[52] U.S. Cl. .................................... 277/153; 277/205
[58] Field of Search .................... 277/231, 124, 188 R, 277/178, 152, 153, 165, 151, 190, 191, 168, 169, 170, 205, 164

[56] References Cited
U.S. PATENT DOCUMENTS

| | | | |
|---|---|---|---|
| 3,738,665 | 6/1973 | Bilco | 277/205 |
| 3,813,105 | 5/1974 | McQueen | 277/164 |

Primary Examiner—Robert I. Smith
Attorney, Agent, or Firm—Siedel, Gonda & Goldhammer

[57] ABSTRACT

An annular seal of resilient material is disclosed and having an axially directed groove containing a spring between two interconnected body portions. At least one of said body portions has a sealing lip projecting in a radial direction generally opposite the location of said spring. Said groove has portions spaced from the bottom and in embracing contact with opposite surfaces of said spring. Said groove bottom being a portion of an ellipse and having embracing contact with a juxtaposed portion of said spring only when the sealing lip is under a compressive load.

6 Claims, 3 Drawing Figures

ANNULAR SEAL

BACKGROUND

Seals of the general type involved herein are classified in class 288. For example, see U.S. Pat. No. 2,934,368 which discloses relevant prior art.

In a seal having a sealing lip under a compressive load only when mounted in an operative sealing position, the spring is deformed from a circular cross section to an elliptical cross section. The design of the groove in which the spring is mounted has heretofore provided space to accommodate the elliptical cross section of the spring. For example, see FIGS. 7 and 8 of said Pat. No. 2,934,368 wherein a straight line across the apex of lips 33 passes substantially above the centerline of spring 37. When the lips are compressed into sealing contact with the members to be sealed, a downward component of force is exerted on spring 37 tending to push it to the bottom of the groove, thereby reducing the effectiveness of said spring. The present invention solves that problem.

This invention is directed to an annular seal of resilient elastomeric material. The body of the seal is provided with an axially directed groove containing a spring between two interconnected body portions. At least one of the body portions has a sealing lip projecting in a radial direction and being generally opposite the location of said spring. The groove has arcuate portions spaced from the bottom of the groove and such arcuate portions are in embracing contact with opposite surfaces of the spring.

The groove bottom is a portion of an ellipse and has embracing contact with a juxtaposed portion of the spring only when the spring and sealing lip are under a compressive load. The spring and lip are placed under a compressive load only when the seal is mounted in an operative sealing position with the surface to be sealed.

It is an object of the present invention to provide an annular seal constructed and arranged to maximize effectiveness of a spring when a sealing lip is placed under a compressive load.

It is another object of the present invention to provide an annular seal wherein a spring between two body portions at least one of which has a sealing lip bottoms out against an elliptical portion of the grooves containing the spring when the sealing lips are placed under a compressive load.

Other objects will appear hereinafter.

For the purpose of illustrating the invention, there is shown in the drawings a form which is presently preferred; it being understood, however, that this invention is not limited to the precise arrangements and instrumentalities shown.

Referring to the drawing in detail, wherein like numerals indicate like elements, there is shown a seal in accordance with the present invention designated generally as 10.

Figure 1:
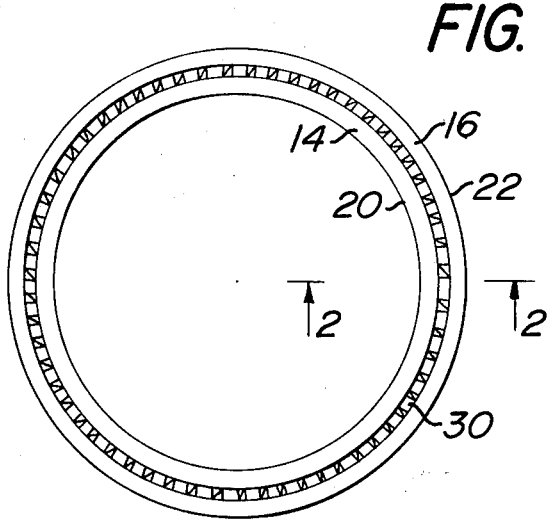
FIG. 1 is a top plan view of a annular seal in accordance with the present invention.

The seal 10 includes an annular body 12 having body portions 14 and 16 defined by an axially extending groove 18. At least one body portion has a sealing lip. As illustrated, body portion 14 has a sealing lip 20 and body portion 16 has a sealing lip 22. Each of the sealing lips 20 and 22 extend in a radial direction. Body 12 is a resilient elastomeric material such as polyurethane.

Groove 18 includes two arcuate portions 24 and 26 having an arcuate length of about 80°-100°. Portion 24 is disposed opposite portion 26. An elliptical groove bottom portion 28 interconnects juxtaposed ends of the portions 24, 26. The radius of curvature of groove portions 24, 26 corresponds to the longitudinal axis of groove 18. The axial extent of groove 18 is preferably less than about one-half the axial length of bottom 12. See FIG. 2.

A biasing member such as spring 30 is disposed within groove 18. Lips 20 and 22 are opposite the location of spring 30. In this regard, a straight line cross the apex of lips 20, 22 passes through or is slightly above the axis of spring 30. Portions 24, 26 are in embracing contact with oppositely disposed areas on the periphery of spring 30.

Figure 2:
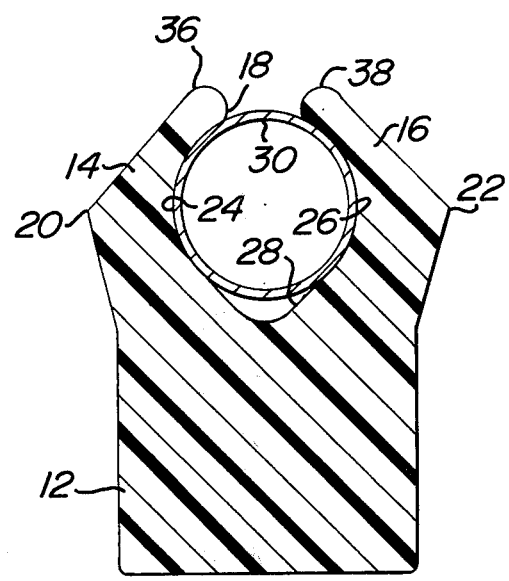
FIG. 2 is a sectional view taken along the line 2—2 in FIG. 1 but on an enlarged scale and with the seal in a static condition.

When there is no compression load on lips 20, 22, spring 30 is out of contact with the groove bottom portion 28 as shown in FIG. 2. Spring 30 is preferably a flat metal radial spring for applying a continuous uniform load on the lips 20 and 22 in a radially inwardly and/or radially outwardly direction. Spring 30 is preferably a discontinuous spring in that it has two free ends which are in abutting contact. Thus, I prefer not to use a circular coil spring.

Figure 3:
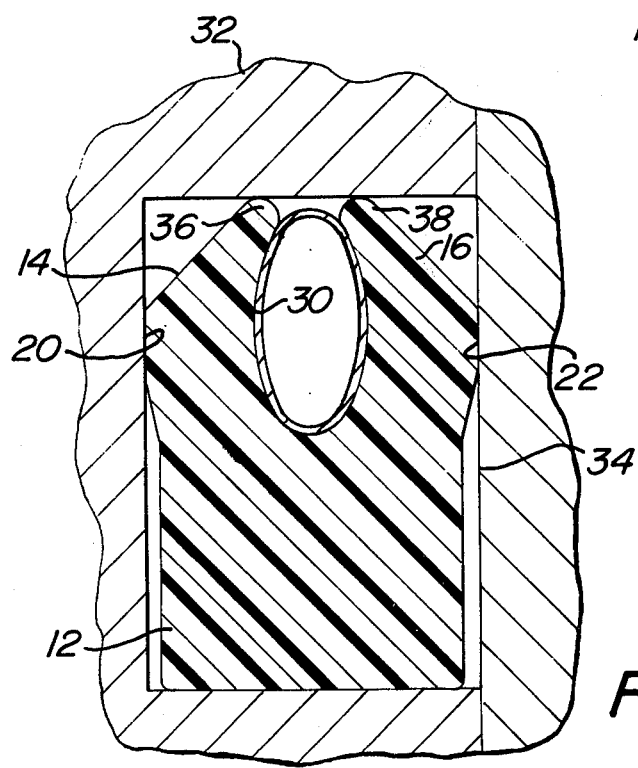
FIG. 3 is a sectional view of the seal mounted in sealing contact with a surface whereby the sealing lips are under a compressive load, with the illustration being of the same scale as that shown in FIG. 2.

Referring to FIG. 3, support member 32 has a circular groove which receives the seal 10 coaxial therewith. Lip 22 is under a compression load due to contact with surface 34 on another member. Structure 32 may have relative movement or rotation relative to surface 34 or vice versa. When the compression load on lip 22 deforms spring 30 into an elliptical shape so that it bottoms out against the groove bottom portion 28, portion 28 resists any further deformation and/or shifting of spring 30 by exerting a force in an axial direction on spring 30. The groove bottom portion 28 is designed to have embracing contact with the juxtaposed portion of spring 30 to prevent spring 30 from shifting to an ineffective or less effective position. It will be noted that the projections 36 and 38 on the body portions 14 and 16 have moved closer together in FIG. 3 as compared to their position in FIG. 2 due to the compression load on the lip 22. Groove 18 contacts at least 270° of the periphery of spring 30.

As the lips 20, 22 are loaded under compression, the spring 30 tends to decrease in a radial direction while increasing in an axial direction. Since the bottom portion 28 of the groove 18 contacts the spring 30 after a predetermined amount of elongation, the spring 30 is in its optimum elliptical shape and fixed to its proper position by the bottom portion 28 and upper portions 36 and 38.

The high rate of thermal retraction inherent in all urethane materials at low temperatures can actually cause sealing lip 22 to pull away from metal sealing surfaces causing seal leakage. This condition can occur frequently during equipment startup in winter. Since the coefficient of thermal retraction for most metals is about one-tenth that of most elastomers, the radially loaded metal spring 30 is a superior energizer for minimizing adverse effects of cold temperatures as low as −65° F. on seals 10 and for maintaining lips 20, 22 in sealing contact.

The present invention may be embodied in other specific forms without departing from the spirit or essential attributes thereof and, accordingly, reference should be made to the appended claims, rather than to the foregoing specification as indicating the scope of the invention.

I claim:

1. An annular seal of resilient elastomeric material having an open axially extending groove at one end between two interconnected body portions, said groove including oppositely disposed arcuate surfaces of approximately the same length and facing one another, each of said surfaces being on one of said body portions, one end of each of said arcuate surfaces merging into a groove bottom which has the shape of an end portion of an ellipse, an annular deformable biasing member generally circular in cross section located in said groove, said arcuate surfaces of the groove being in embracing contact with opposite surfaces of said biasing member at all times, said biasing member being spaced from said groove bottom when the seal is not under a compression load, at least one of said body portions having a sealing lip projecting in a radial direction at a location generally opposite from the longitudinal axis of said biasing member, the gap across the end of the groove remote from said groove bottom being substantially smaller than the diameter of said biasing member, said end portion of an ellipse at said groove bottom having embracing contact with a juxtaposed portion of said biasing member only when said sealing lip is under a compression load, said sealing lip being under a compression load only when the seal is mounted in an operative sealing position with a surface to be sealed.

2. An annular seal in accordance with claim 1 wherein said annular deformable biasing member comprises a spring.

3. An annular seal in accordance with claim 2 wherein said spring is a flat radial metal spring for exerting uniform load on the sealing lip.

4. An annular seal in accordance with claim 1 wherein the surface of said groove has sealing contact with about 270° of the surface of said biasing member when said lip is under a compression load.

5. An annular seal in accordance with claim 4 wherein each body portion has a sealing lip, said sealing lips extending in opposite radial directions and terminating in an apex so that a line across the apex of each lip passes above the longitudinal axis of said biasing member.

6. An annular seal in accordance with claim 5 wherein said material is polyurethane.

* * * * *